United States Patent
Zhang et al.

(10) Patent No.: US 12,215,047 B2
(45) Date of Patent: Feb. 4, 2025

(54) GLASS PART AND MANUFACTURING METHOD THEREFOR, AND DEVICE

(71) Applicant: BYD COMPANY LIMITED, Shenzhen (CN)

(72) Inventors: Jiaxin Zhang, Shenzhen (CN); Hu Zhou, Shenzhen (CN); Qiongyan Jiang, Shenzhen (CN); Feifei Duan, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 214 days.

(21) Appl. No.: 17/771,585

(22) PCT Filed: Apr. 30, 2020

(86) PCT No.: PCT/CN2020/088412
§ 371 (c)(1),
(2) Date: Apr. 25, 2022

(87) PCT Pub. No.: WO2021/077709
PCT Pub. Date: Apr. 29, 2021

(65) Prior Publication Data
US 2022/0363580 A1    Nov. 17, 2022

(30) Foreign Application Priority Data

Oct. 23, 2019  (CN) .......................... 201911010596.2

(51) Int. Cl.
*C03B 11/08* (2006.01)
*C03B 31/00* (2006.01)
(Continued)

(52) U.S. Cl.
CPC ............ *C03B 11/082* (2013.01); *C03B 31/00* (2013.01); *C03C 15/00* (2013.01); *C03C 19/00* (2013.01);
(Continued)

(58) Field of Classification Search
CPC . C03B 11/082; C03B 31/00; C03B 2215/412; B32B 3/28; B32B 3/30; C03C 15/00; C03C 19/00; Y10T 428/24479
See application file for complete search history.

(56) References Cited

U.S. PATENT DOCUMENTS

| 4,826,292 A | 5/1989 | Spohr et al. |
| 2012/0097239 A1* | 4/2012 | Sato ........................ C03C 15/00 257/E31.13 |

FOREIGN PATENT DOCUMENTS

| CN | 102625784 A | 8/2012 |
| CN | 103864316 A | 6/2014 |

(Continued)

OTHER PUBLICATIONS

The World Intellectual Property Organization (WIPO) International Search Report for PCT/CN2020/088412 Jul. 8, 2020 4 pages (with translation).

*Primary Examiner* — Catherine A. Simone
(74) *Attorney, Agent, or Firm* — Wenye Tan

(57) ABSTRACT

A glass part includes a substrate and a texture reinforcement layer disposed on at least one surface of the substrate. The texture reinforcement layer includes a plurality of reinforcement units. Cross sections of an outer surface of each reinforcement unit in at least a horizontal direction and a vertical direction are in a hyperbolic shape or a parabolic shape.

8 Claims, 3 Drawing Sheets

(51) Int. Cl.
*C03C 15/00* (2006.01)
*C03C 19/00* (2006.01)

(52) U.S. Cl.
CPC . *C03B 2215/412* (2013.01); *Y10T 428/24479* (2015.01)

(56) References Cited

FOREIGN PATENT DOCUMENTS

| CN | 107771169 A | 3/2018 |
| KR | 20170119799 A | 10/2017 |
| WO | 2019055745 A1 | 3/2019 |

\* cited by examiner

GLASS PART AND MANUFACTURING METHOD THEREFOR, AND DEVICE

CROSS-REFERENCE TO RELATED APPLICATIONS

This application is a national stage entry under 35 U.S.C. § 371 of International Application No. PCT/CN2020/088412, filed on Apr. 30, 2020, claims priority to Chinese Patent Application No. 201911010596.2, entitled "GLASS MEMBER, PREPARATION METHOD THEREFOR AND DEVICE" and filed on Oct. 23, 2019, the entire contents of all of which are incorporated herein by reference.

FIELD

The present disclosure relates to the technical field of glass, and in particular, to a glass part and a manufacturing method therefor, and a device.

BACKGROUND

As technologies advance, glass products are used everywhere in daily life, such as construction, transportation, furniture, containers, and electronic products. A main component of glass is $SiO_2$. A raw glass sheet has a plurality of functions after various deep processing, for example, AR anti-reflection glass, AG glass, DG scratch-resistant glass, and ITO conductive glass. However, before application the raw glass sheet is usually strengthened to improve a strength of the raw glass sheet or form safety glass, so as to protect a surface of a device.

A conventional glass strengthening method mainly includes physical strengthening and chemical strengthening. A principle of physical strengthening is to heat the glass to a proper temperature and then rapidly cool the glass to cause a surface of the glass to shrink sharply, thereby generating a pressure stress. Since cooling of a middle layer of the glass is slow, a tensile stress is formed before shrinkage, so that the glass can obtain a relatively high strength. A basic principle of chemical strengthening is to change a composition of the surface of the glass to improve the strength of the glass. A method is to exchange ions such as $Na^+$ or $K^+$ on the surface of the glass with alkali metal ions to form an ion exchange layer on the surface. A different volume of the alkali ions results in an embedding and extrusion stress on the surface of the glass. When the glass is cooled to the room temperature, the glass is in a state in which an inner layer is in tension and an outer layer is in compression. Therefore, the strength is improved.

Although a strength and a temperature resistance of the tempered glass obtained by using the foregoing method are 3 to 5 times higher than those of the raw glass sheet, the glass has many disadvantages. For example, the glass cannot be cut, drilled, or ground. Therefore, the glass needs to be processed to a required shape before strengthening. However, in case of a large temperature difference, the glass may burst, that is, cracks without an external mechanical force.

Therefore, the strengthening of glass parts requires further study.

SUMMARY

An objective of the disclosure is to at least resolve one of the technical problems in the related art to some extent. The disclosure is intended to provide a glass part. The glass part has a relatively desirable strength.

According to an aspect of the disclosure, the disclosure provides a glass part. According to an embodiment of the disclosure, the glass part includes a substrate and a texture reinforcement layer disposed on at least one surface of the substrate. The texture reinforcement layer includes a plurality of reinforcement units. Cross sections of an outer surface of each reinforcement unit in at least a horizontal direction and a vertical direction are in a hyperbolic shape or a parabolic shape. Since the cross sections on the reinforcement unit in at least the horizontal direction and the vertical direction are in the hyperbolic shape or the parabolic shape, the reinforcement unit (or the texture reinforcement layer) having the structure can prevent microcracks (also referred to as Griffith crack) on the surface of the glass part from forming a stress line in any direction by means of extension. Therefore, expansion and spread of the microcracks on the surface of the glass part can be effectively inhibited or resolved, thereby improving an actual fracture strength of the glass part. The actual fracture strength of the glass part approximates a theoretical fracture strength.

According to another aspect of the disclosure, the disclosure provides a method for manufacturing the foregoing glass part. According to an embodiment of the disclosure, the method for manufacturing the glass part includes: patterning a surface of a raw glass sheet to obtain the texture reinforcement layer. The foregoing method is simple, easy to operate, and mature in process, and facilitates industrial production. In addition, by means of the method, a required texture reinforcement layer can be effectively manufactured on the surface of the raw glass sheet, to obtain a glass part having a relatively large fracture strength. Those skilled in the art may understand that the manufacturing method has all of the features and the advantages of the foregoing glass part. Details are not described herein again.

According to still another aspect of the disclosure, the disclosure provides a device. According to an embodiment of the disclosure, at least part of the device is formed by the foregoing glass part. The glass part of the device has a relatively high fracture strength, and can effectively resist external impact. Those skilled in the art may understand that the device has all of the features and the advantages of the foregoing glass part. Details are not described herein again.

DETAILED DESCRIPTION

Embodiments of the disclosure are described in detail below. The following described embodiments are illustrative only for explaining the disclosure, and are not to be construed as limiting the disclosure. The embodiments in which specific technologies or conditions are not indicated shall be carried out in accordance with the technologies or conditions described in the literature in the art or in accordance with the product specification.

Figure 1:
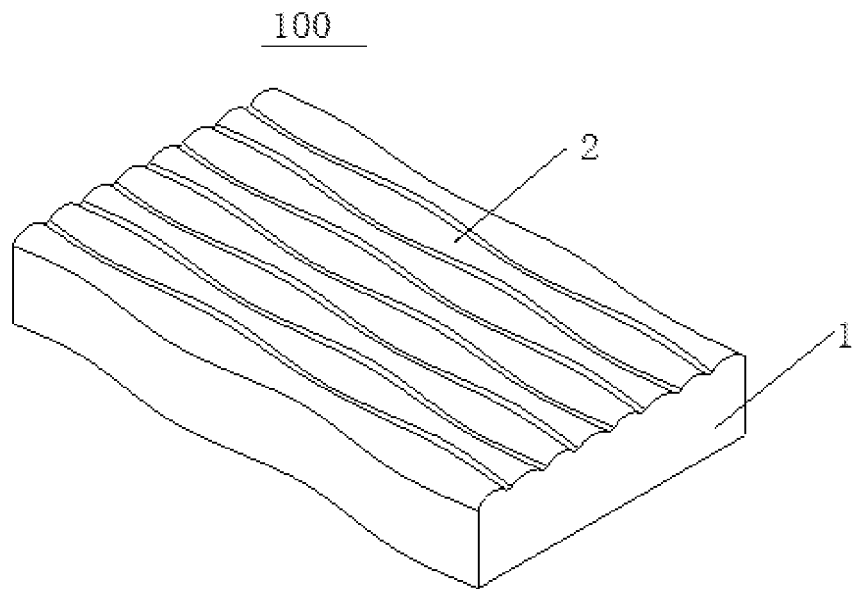
FIG. 1 is a schematic structural diagram of a glass part according to an embodiment of the disclosure.

According to an aspect of the disclosure, the disclosure provides a glass part. According to an embodiment of the disclosure, referring to FIG. 1 and FIG. 2, a glass part 100 includes a substrate 1 and a texture reinforcement layer 2 disposed on at least one surface of the substrate 1. The texture reinforcement layer 2 includes a plurality of reinforcement units 3. Cross sections of an outer surface of each reinforcement unit 3 in at least a horizontal direction and a vertical direction are in a hyperbolic shape or a parabolic shape (in FIG. 2, for example, the cross section in the horizontal direction is in the hyperbolic shape, the cross section in the vertical direction is in the parabolic shape, such as a parabola 31 having an upward opening, a hyperbola 32 having leftward and rightward openings, and a parabola 33 having a downward opening in FIG. 2). Since the cross sections on the reinforcement unit in at least the horizontal direction and the vertical direction are in the hyperbolic shape or the parabolic shape, the reinforcement unit (or the texture reinforcement layer) having the structure can prevent microcracks on the surface of the glass part from forming a stress line in any direction by means of extension. Therefore, expansion and spread of the microcracks on the surface of the glass part can be effectively inhibited or resolved, thereby improving an actual fracture strength of the glass part. The actual fracture strength of the glass part approximates a theoretical fracture strength. In addition, the surface of the glass part further has a texture pattern. Therefore, an appearance effect of the glass part can be improved.

It is to be noted that, "the cross section on the outer surface of the reinforcement unit in the horizontal direction" is a line of intersection between a plane parallel to the horizontal direction and the outer surface of the reinforcement unit. Likewise, "the cross section on the outer surface of the reinforcement unit in the vertical direction" is a line of intersection between a plane parallel to the vertical direction and the outer surface of the reinforcement unit.

It is to be further noted that, the "parabolic shape" in the expression "cross sections on an outer surface of each reinforcement unit in at least a horizontal direction and a vertical direction are in a hyperbolic shape or a parabolic shape" means that a trajectory of each cross section is a parabola (that is, satisfies a parabolic equation) and/or a non-parabola in a parabolic-like shape (that is, although the trajectory does not satisfy the parabolic equation, a shape of the trajectory is similar to the parabola, for example, the non-parabola has a vertex and an opening but no axis of symmetry). Likewise, the "hyperbolic shape" means that the trajectory of the cross section is a hyperbola (that is, satisfies a hyperbolic equation) and/or a non-hyperbola in a hyperbolic-like shape (that is, although the trajectory does not satisfy the hyperbolic equation, the non-hyperbola has a shape similar to that of the hyperbola, but has no axis of symmetry).

In some embodiments of the disclosure, the cross section on the outer surface of the reinforcement unit in the horizontal direction is in the hyperbolic shape (such as the hyperbolas 32 shown in FIG. 2), and the cross section on the outer surface of the reinforcement unit in the vertical direction is in the parabolic shape (such as the parabola 31 and the parabola 32 shown in FIG. 2) or in the hyperbolic shape (not shown in the figure). That is to say, the cross sections on the outer surface of the reinforcement unit in the vertical direction at different positions may be in the parabolic shape or in the hyperbolic shape.

Figure 3:
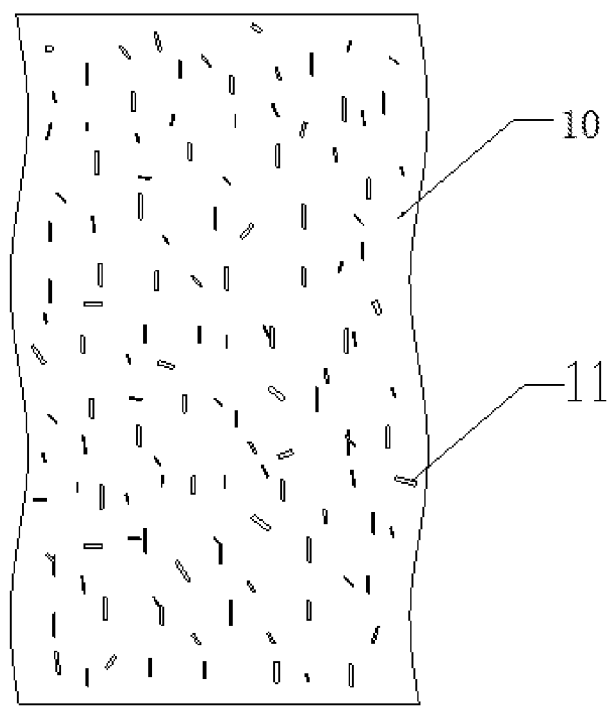
FIG. 3 is a schematic diagram of a microcrack on a surface of the glass part.
Figure 4:
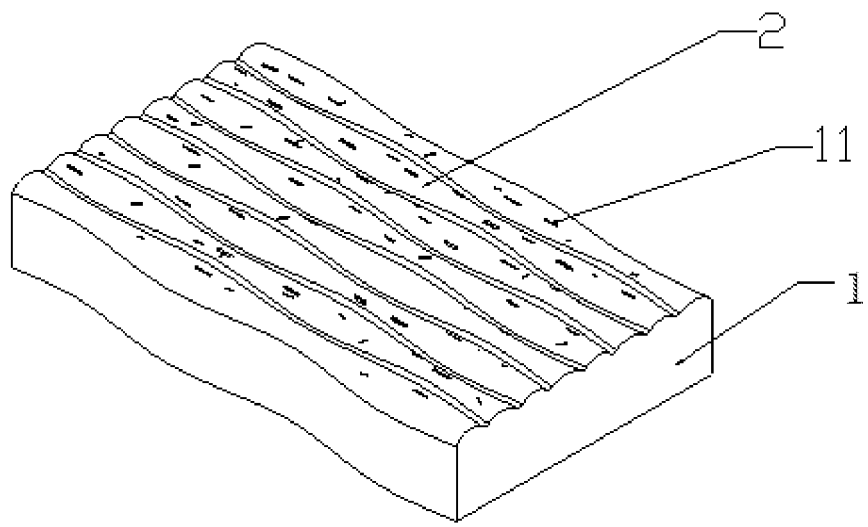
FIG. 4 is a schematic structural diagram of a glass part according to still another embodiment of the disclosure.

A theoretical fracture strength of glass is a theoretical feasible maximum fracture strength of the glass. Calculation of the theoretical fracture strength of the glass relies on a bonding force between atoms. This is because the glass can beak only after overcoming the bonding force between the atoms. The theoretical fracture strength of the glass is about $0.7*10^4$ Mpa, which is far greater than the actual fracture strength. A cause of the great disparity between the theoretical value and the actual value of the fracture strength is as follows: Many microcracks 11 (referring to FIG. 3) invisible to naked eyes are generated on the surface of the glass 10 during manufacturing. Generally, a depth of the microcrack on the glass part (that is, a depth by which each microcrack extends into the glass part from the surface of the glass part) is about 0.005 mm (a depth of a microcrack on a glass part applicable to a precise instrument is smaller), and a width ranges from about 0.00001 mm to 0.00002 mm. Hundreds of microcracks (also referred to as Griffith crack) exist per square millimeter. A significant stress concentration effect is generated in areas near the microcrack defects. A maximum tensile stress of the areas is much greater than an average tensile stress. The fracture mechanics states that a cause of fracture during construction of glass is that cracks exist in the glass and expand at a specific stress level. The extension of the microcracks greatly reduces the strength of the glass. In addition, the fracture strength is directly related to the crack depth. If the depth of the microcrack on the surface of the glass is greater than 0.005 mm, the strength is smaller. Therefore, referring to FIG. 4 and FIG. 5, in the disclosure, the texture reinforcement layer 2 is disposed on a surface of a glass substrate 1. Since the cross sections on the outer surface of the reinforcement unit 3 in at least the horizontal direction and the vertical direction are in the hyperbolic shape or the parabolic shape, the reinforcement unit 3 (or the texture reinforcement layer 2) having the structure can prevent the microcracks 11 on the surface of the glass part from forming a stress line in any direction by means of extension. Therefore, expansion and spread of the microcracks 11 on the surface of the glass part can be effectively inhibited or resolved, thereby improving actual fracture strength of the glass part. The actual fracture strength of the glass part approximates a theoretical fracture strength.

It is to be noted that, the substrate 1 and the texture reinforcement layer 2 are both made of a glass material. That is to say, at least one surface of the glass part has a texture with a specific thickness. The texture with the thickness is the texture reinforcement layer. In addition, those skilled in the art may understand that, the texture reinforcement layer includes a plurality of reinforcement units. That is to say, the texture reinforcement layer is composed of the plurality of reinforcement units. Each reinforcement unit also has a specific thickness. The cross sections on the outer surface of the reinforcement unit in at least the horizontal direction and the vertical direction are in the hyperbolic shape or the parabolic shape. Therefore, the surface of the glass part presents an uneven state. In addition, the stress line is a line having a relatively large stress. The stress line is generally formed by expansion of a maximum stress point, and is a position on the glass most likely to fail and fracture.

Figure 2:
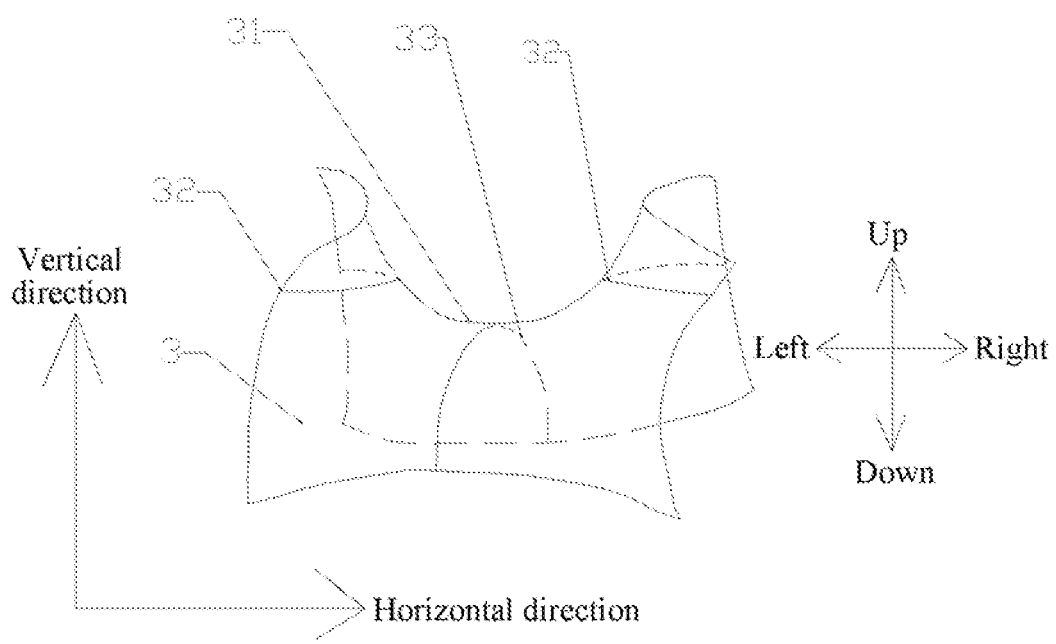
FIG. 2 is a schematic structural diagram of a reinforcement unit according to another embodiment of the disclosure.
Figure 5:
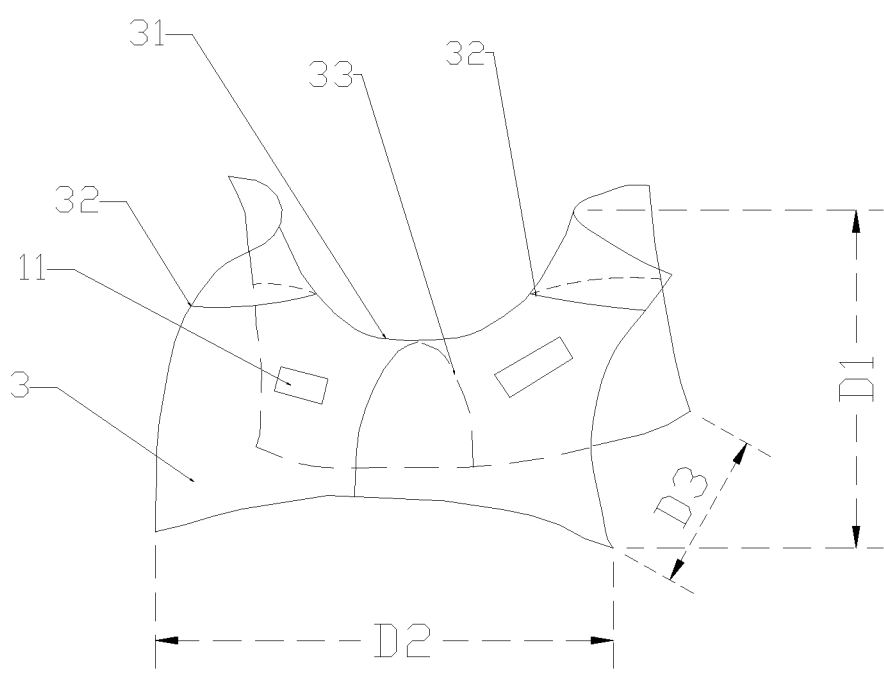
FIG. 5 is a schematic structural diagram of a reinforcement unit according to still another embodiment of the disclosure.

According to an embodiment of the disclosure, referring to FIG. 2 and FIG. 5, the outer surface of the reinforcement unit is a hyperbolic paraboloid (also referred to as a saddle surface, which is a hyperbolic paraboloid formed by using a parabola as a generatrix). Therefore, the cross sections on the outer surface of the hyperbolic paraboloid in at least the horizontal direction and the vertical direction are in the hyperbolic shape or the parabolic shape. When the microcracks 11 are about to expand in any direction, the microcracks are restrained by both a convex surface and a concave surface of the hyperbolic paraboloid (that is to say, when the microcracks are subjected to a tension (a tensile stress), the concave surface of the hyperbolic paraboloid is stressed, and the tensile stress is transferred to the convex surface due to a structure of the hyperbolic paraboloid, to convert the tensile stress to a pressure stress, so that when the microcracks are squeezed and subjected to the pressure stress, the convex surface can withstand pulling to prevent microcracking). In this way, the microcracks are prevented from forming a stress line in any direction by means of extension, and expansion and spread of the microcracks are prevented or inhibited, thereby improving the actual fracture strength of the glass part.

The foregoing hyperbolic paraboloid may be a standard hyperbolic paraboloid, that is, satisfies an equation $(x^2/a^2)-(x^2/b^2)=\pm 2z$. The cross sections in the horizontal direction and the vertical direction are standard hyperbolas or standard parabolas. Alternatively, the hyperbolic paraboloid may be a non-standard hyperbolic paraboloid, that is, the hyperbolic paraboloid does not satisfy the equation $(x^2/a^2)-(x^2/b^2)=\pm 2z$, but has a shape similar to the shape of the hyperbolic paraboloid. At least one of cross section curves in the horizontal direction and the vertical direction is a non-standard hyperbola or a non-standard parabola. For example, at least part of the non-standard hyperbolic paraboloid is formed by using the non-standard parabola as a generatrix.

Figure 6:
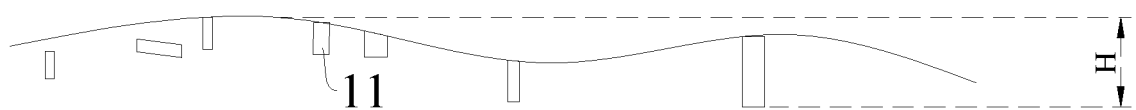
FIG. 6 is a schematic diagram of a depth of a microcrack on a surface of the glass part.

According to an embodiment of the disclosure, in order to improve the actual fracture strength of the glass part more effectively, referring to FIG. 5, a depth D1 (or a thickness) of the reinforcement unit 3 is greater than or equal to a depth H (referring to FIG. 6) of the microcrack 11 (that is, a depth of the texture reinforcement layer is greater than or equal to the depth H of the microcrack). Therefore, the microcrack can be effectively prevented from forming the stress line under external impact. It is to be noted that, a depth varies at a different position on the reinforcement unit. The depth D1 of the reinforcement unit is a vertical distance between a highest point of an upper surface of the reinforcement unit and a lowest point of a lower surface. The depth of the microcrack is a depth from a highest point of the surface of the glass part to a deepest position to which all of the microcracks on the surface of the glass part extend in the glass part. Therefore, those skilled in the art may understand that, actual depths of some microcracks are less than the depth H of the microcrack.

Further, the depth D1 of the reinforcement unit (or the texture reinforcement layer) is less than or equal to 0.05 mm, for example, 0.05 mm, 0.045 mm, 0.04 mm, 0.035 mm, 0.03 mm, 0.025 mm, 0.02 mm, 0.015 mm, 0.01 mm, 0.008 mm, 0.005 mm, 0.001 mm. Therefore, the microcrack can be effectively prevented from forming the stress line under external impact, thereby improving the actual fracture strength of the glass part. If the thickness of the reinforcement unit is greater than 0.05 mm, the thickness of the reinforcement unit is much greater than an actual depth of the microcrack. That is to say, the actual depth of the microcrack is much less than the depth of the reinforcement unit. In this case, the microcrack can freely extend in a transverse direction and a longitudinal direction of the texture reinforcement layer (that is, the microcrack is less restrained by the convex surface and the concave surface of the hyperbolic paraboloid). As a result, the actual fracture strength of the glass part is improved less effectively, and even the strength of the glass cannot be improved, and the light transmittance of the glass part is relatively reduced.

Further, the depth of the reinforcement unit ranges from 0.001 mm to 0.01 mm. Therefore, the microcrack can be effectively prevented from forming the stress line under external impact, thereby improving the actual fracture strength of the glass part. In addition, desirable light transmittance of the glass part is guaranteed. In addition, those skilled in the art may design the depth of the reinforcement unit according to a purpose of the glass part and the depth of the microcrack. That is to say, if a depth of a microcrack on an ordinary glass part is relatively large, a reinforcement unit having a relatively large depth may be designed. A depth of the microcrack on the glass part for a precise instrument is relatively small. Therefore, a reinforcement unit having a relatively small depth may be designed.

According to an embodiment of the disclosure, referring to FIG. 5, a width D3 of the reinforcement unit is less than or equal to 0.05 mm, for example, 0.05 mm, 0.045 mm, 0.04 mm, 0.035 mm, 0.03 mm, 0.025 mm, 0.02 mm, 0.015 mm, 0.01 mm, 0.008 mm, 0.005 mm, 0.001 mm. Therefore, the microcrack can be effectively prevented from forming the stress line under external impact, thereby improving the actual fracture strength of the glass part. If the width of the reinforcement unit is greater than 0.05 mm, the width of the reinforcement unit is much greater than a size of the microcrack. That is to say, the width of the microcrack is much less than the width of the reinforcement unit. In this case, the microcrack can freely extend in a transverse direction and a longitudinal direction of the texture reinforcement layer (that is, the microcrack is less restrained by the convex surface and the concave surface of the hyperbolic paraboloid). As a result, the actual fracture strength of the glass part is improved less effectively, and even the strength of the glass cannot be improved, and the light transmittance of the glass part is relatively reduced.

According to an embodiment of the disclosure, referring to FIG. 5, a length D2 of the reinforcement unit is less than or equal to 0.05 mm, for example, 0.05 mm, 0.045 mm, 0.04 mm, 0.035 mm, 0.03 mm, 0.025 mm, 0.02 mm, 0.015 mm, 0.01 mm, 0.008 mm, 0.005 mm, 0.001 mm. Therefore, the microcrack can be effectively prevented from forming the stress line under external impact, thereby improving the actual fracture strength of the glass part. If the length of the reinforcement unit is greater than 0.05 mm, the length of the reinforcement unit is much greater than the width of the microcrack. That is to say, the width of the microcrack is much less than the length of the reinforcement unit. In this case, the microcrack can freely extend in a transverse direction and a longitudinal direction of the texture reinforcement layer (that is, the microcrack is less restrained by the convex surface and the concave surface of the hyperbolic paraboloid). As a result, the actual fracture strength of the glass part is improved less effectively, and even the strength of the glass cannot be improved, and the light transmittance of the glass part is relatively reduced.

In some embodiments, the width of the reinforcement unit ranges from 0.001 mm to 0.01 mm, and the length of the reinforcement unit ranges from 0.001 mm to 0.01 mm. Therefore, the actual fracture strength of the glass part can be improved more effectively.

According to an embodiment of the disclosure, the texture reinforcement layer includes the plurality of reinforcement units. Depths, widths, and lengths of the different reinforcement units may be the same or different, which are not specially limited herein. Those skilled in the art may flexibly select depths, widths, and lengths according to actual situations. For example, in some embodiments, the depth of each reinforcement unit ranges from 0.001 mm to 0.01 mm. Depths of all reinforcement units of a same glass part may be the same, for example, 0.006 mm. The depths of all of the reinforcement units of the same glass part may alternatively vary from 0.001 to 0.01 mm. For example, in the same glass part, the depths of some reinforcement units are 0.005 mm, the depths of some reinforcement units may be 0.003 mm, and the depths of some reinforcement units may be 0.009 mm.

According to another aspect of the disclosure, the disclosure provides a method for manufacturing the foregoing glass part. According to an embodiment of the disclosure, the method for manufacturing the glass part includes: patterning a surface of a raw glass sheet to obtain the texture reinforcement layer. The method by means of patterning is simple, easy to operate, and mature in process, and facilitates industrial production. In addition, by means of the method, a required texture reinforcement layer can be effectively manufactured on the surface of the raw glass sheet, to obtain a glass part having a relatively large fracture strength. Those skilled in the art may understand that the manufacturing method has all of the features and the advantages of the foregoing glass part. Details are not described herein again.

According to an embodiment of the disclosure, the patterning includes chemical etching, laser etching, or die stamping. The process is mature and is easy to control, facilitates industrial production, and has low costs.

According to an embodiment of the disclosure, a specific step of the chemical etching may include: forming a photoresist on the surface of the raw glass sheet, and then performing exposure and development, to obtain the glass part having the texture reinforcement layer on the surface. The method is mature in process and easy to operate, and facilitates industrial production. No special limitations and requirements are imposed on used etchants and photoresists. Those skilled in the art may flexibly select etchants and photoresists according to actual requirements.

According to an embodiment of the disclosure, laser etching is performed. That is to say, a texture reinforcement layer having a required size is etched on the surface of the raw glass sheet by using a high-energy pulse laser beam. The two methods are mature in process and easy to operate, and facilitate industrial production. No special limitations and requirements are imposed on pulse energy of the laser. Those skilled in the art may flexibly select the pulse energy according to actual requirements such as the size of the reinforcement unit.

According to an embodiment of the disclosure, the die stamping includes the following steps:

Step 1: The raw glass sheet is placed into a die having a predetermined texture. In order to obtain a desired texture of the texture reinforcement layer, a die having a corresponding texture may be manufactured according to the texture of the texture reinforcement layer, that is, a die having a predetermined texture is obtained. A cross section of an outer surface of the predetermined texture in any direction is a parabola.

Step 2: the raw glass sheet is heated to a predetermined temperature, where the predetermined temperature is greater than a softening temperature of the raw glass sheet, and the texture reinforcement layer on the surface of the raw glass sheet is obtained by pressing in the die. Further, after pressing, the glass part is required to be cooled to a temperature less than the softening temperature for demolding, and then the glass part is cooled to a room temperature. In this way, the glass part is obtained.

According to still another aspect of the disclosure, the disclosure provides a device. According to an embodiment of the disclosure, at least part of the device is formed by the foregoing glass part. The glass part of the device has a relatively high fracture strength, and can effectively resist external impact. Those skilled in the art may understand that the device has all of the features and the advantages of the foregoing glass part. Details are not described herein again.

According to an embodiment of the disclosure, the foregoing device is a glass container, an electronic device, an automobile, or furniture. Therefore, the glass part of the disclosure is widely used. Further, no special limitation is imposed on a specific type of the foregoing electronic device. Those skilled in the art may flexibly select the electronic device according to actual requirements. For example, the specific type of the foregoing electronic device includes, but is not limited to electronic devices such as a mobile phone, an iPad, a notebook, a television, or a game console. The glass part may be configured to manufacture a housing (or a cell cover) of the electronic device. In this way, a fracture strength of the electronic device can be improved (that is, drop resistance of the housing is improved). In addition, the housing can have a relatively desirable appearance effect.

In the description of this specification, the description of the reference terms such as "an embodiment", "some embodiments", "exemplary embodiments", "example", "specific example", or "some examples" means that the specific features, structures, materials or characteristics described with reference to the embodiment or example are included in at least one embodiment or example of the disclosure. In this specification, exemplary descriptions of the foregoing terms do not necessarily refer to a same embodiment or example. Besides, the specific features, the structures, the materials or the characteristics that are described may be combined in proper manners in any one or more embodiments or examples. In addition, a person skilled in the art may integrate or combine different embodiments or examples described in the specification and features of the different embodiments or examples as long as they are not contradictory to each other.

Although the embodiments of the disclosure have been shown and described above, it can be understood that, the foregoing embodiments are exemplary and should not be understood as limitation to the disclosure. A person of ordinary skill in the art can make changes, modifications, replacements, or variations to the foregoing embodiments within the scope of the disclosure.

What is claimed is:

1. A glass piece, comprising a substrate and a texture reinforcement layer disposed on at least one surface of the substrate, wherein the texture reinforcement layer comprises a plurality of reinforcement units, and cross sections of an outer surface of each reinforcement unit in at least a horizontal direction and a vertical direction are in a hyperbolic shape or a parabolic shape, wherein a depth of the reinforcement unit is greater than or equal to a depth of a microcrack on a surface of the glass part.

2. The glass piece according to claim 1, wherein the outer surface of the reinforcement unit is a hyperbolic paraboloid.

3. The glass part according to claim 1, wherein the depth of the reinforcement unit is less than or equal to 0.05 mm.

4. The glass part according to claim 3, wherein the depth of the reinforcement unit ranges from 0.001 mm to 0.01 mm.

5. The glass part according to claim 1, wherein a width of the reinforcement unit is less than or equal to 0.05 mm.

6. The glass part according to claim 5, wherein the width of the reinforcement unit ranges from 0.001 mm to 0.01 mm.

7. The glass part according to claim 5, wherein a length of the reinforcement unit is less than or equal to 0.05 mm.

8. The glass part according to claim 7, wherein the length of the reinforcement unit ranges from 0.001 mm to 0.01 mm.

* * * * *